United States Patent
Kim et al.

(10) Patent No.: US 10,062,194 B2
(45) Date of Patent: Aug. 28, 2018

(54) SPLIT IMAGE PAGE GENERATING APPARATUSES, METHODS, AND COMPUTER-READABLE STORAGE MEDIUMS, AND IMAGE CONTENT DISPLAYING APPARATUSES

(71) Applicant: NAVER Corporation, Seongnam-si, Gyeonggi-do (KR)

(72) Inventors: Hyo Kim, Seongnam-si (KR); Hyun Chul Lee, Seongnam-si (KR); Ji Han Kim, Seongnam-si (KR); Dai Hyun Lim, Seongnam-si (KR); Byoung Kwan Kim, Seongnam-si (KR)

(73) Assignee: Naver Corporation, Seongnam-si (KR)

( * ) Notice: Subject to any disclaimer, the term of this patent is extended or adjusted under 35 U.S.C. 154(b) by 63 days.

(21) Appl. No.: 15/072,893

(22) Filed: Mar. 17, 2016

(65) Prior Publication Data
US 2016/0274774 A1    Sep. 22, 2016

(30) Foreign Application Priority Data
Mar. 20, 2015 (KR) ........................ 10-2015-0038935

(51) Int. Cl.
*G06T 11/60* (2006.01)

(52) U.S. Cl.
CPC .......... *G06T 11/60* (2013.01); *G06T 2210/22* (2013.01)

(58) Field of Classification Search
None
See application file for complete search history.

(56) References Cited

U.S. PATENT DOCUMENTS

| 8,239,785 B2 | 8/2012 | Hinckley et al. |
| 9,672,585 B1 * | 6/2017 | Steinberger ........... G06T 3/0006 |

(Continued)

FOREIGN PATENT DOCUMENTS

| CN | 102725711 A | 10/2012 |
| JP | 2005-292886 A | 10/2005 |

(Continued)

OTHER PUBLICATIONS

Korean Office Action for Korean Application No. 10-2015-0038935 dated Feb. 12, 2016.

(Continued)

*Primary Examiner* — Asher Kells
(74) *Attorney, Agent, or Firm* — Harness, Dickey & Pierce, P.L.C.

(57) ABSTRACT

An image content generating apparatus includes processing circuitry configured to execute computer-readable instructions to: split an image page into a plurality of page portions, the image page including a plurality of image layers, each of the plurality of image layers including at least one of an image and text; split at least a first of the plurality of image layers into a plurality of first image layer portions; associate each of the plurality of image layers and the plurality of first image layer portions with at least one of the plurality of page portions; and generate split image pages corresponding to the plurality of page portions, at least a first of the split image pages including at least one of (i) an image layer from among the plurality of image layers and (ii) a first image layer portion from among the plurality of first image layer portions.

19 Claims, 18 Drawing Sheets

(56) References Cited

U.S. PATENT DOCUMENTS

| | | | |
|---|---|---|---|
| 2011/0185318 A1 | 7/2011 | Hinckley et al. | |
| 2011/0310104 A1* | 12/2011 | Dicke | G06T 13/80 345/473 |
| 2012/0210259 A1* | 8/2012 | Bederson | G06F 3/0481 715/765 |
| 2013/0326341 A1* | 12/2013 | Nonaka | G06T 11/60 715/246 |

FOREIGN PATENT DOCUMENTS

| | | |
|---|---|---|
| JP | 2011-033850 | 2/2011 |
| KR | 20140072321 A | 6/2014 |

OTHER PUBLICATIONS

Korean Office Action dated Mar. 31, 2017 in Korean Application No. 2015-0038935.
Taiwanese Office Action dated Mar. 7, 2017 in Taiwanese Patent Application No. 105108405, with English translation.
Non-Final Office Action dated Jun. 1, 2018 in U.S. Appl. No. 15/935,499.

\* cited by examiner

SPLIT IMAGE PAGE GENERATING APPARATUSES, METHODS, AND COMPUTER-READABLE STORAGE MEDIUMS, AND IMAGE CONTENT DISPLAYING APPARATUSES

CROSS-REFERENCE TO RELATED APPLICATION(S)

This application claims priority under 35 U.S.C. § 119 to Korean Patent Application No. 10-2015-0038935, filed on Mar. 20, 2015, in the Korean Intellectual Property Office, the disclosure of which is incorporated herein in its entirety by reference.

BACKGROUND

Field

One or more example embodiments relate to image content generating apparatuses, methods, computer-readable storage mediums, and image content displaying apparatuses, for example, to image generating apparatuses, methods, computer-readable storage mediums including computer programs for generating split pages by splitting image pages, and image content displaying apparatuses for displaying image content including split pages.

Description of the Related Art

A cartoon is a picture intended to satirize or criticize life or society by exaggerating or omitting features of an object and using humor, caricature, social commentary, etc. Cartoons may be classified as, for example, a romance cartoon, a martial arts cartoon, an action cartoon, a comic cartoon, a sports cartoon, a science fiction (SF) cartoon, etc., according to the contents thereof. A cartoon may show complex human emotions using a visual system of pictures and characters (text), and thus, is more effective in attracting the attention of readers than a book containing only characters. Recently, with advancements in communication technology, cartoons have been provided not only through comic books, but also via the Internet or the like.

SUMMARY

One or more example embodiments relate to image content generating apparatuses, methods, computer-readable storage mediums, and image content displaying apparatuses, for example, to image generating apparatuses, methods, computer-readable storage mediums including computer programs for generating split pages by splitting image pages, and image content displaying apparatuses for displaying image content including split pages.

One or more example embodiments relate to cartoon content generating apparatuses, methods, computer-readable storage mediums, and cartoon content displaying apparatuses, for example, to image generating apparatuses, methods, computer-readable storage mediums including computer programs for generating split pages by splitting image pages, and cartoon content displaying apparatuses for displaying image content including split pages One or more example embodiments provide cartoon content generating apparatuses, methods, and computer-readable storage mediums including computer program, for splitting cartoon pages according to intentions of cartoon content generators.

One or more example embodiments provide cartoon content generating apparatuses, methods, and computer-readable storage mediums including computer program, for splitting both a layer and a page with respect to a page including a plurality of layers, and setting the split layer to be included in the split page.

One or more example embodiments provide cartoon content displaying apparatuses configured to control split pages to be more naturally connected and/or displayed.

Additional aspects will be set forth in part in the description which follows and, in part, will be apparent from the description, or may be learned by practice of the example embodiments.

According to one or more example embodiments, a cartoon content generating apparatus comprises: a split input controller configured to control a split signal for splitting a page including a plurality of layers into at least two page pieces; a split processor configured to split the page into page pieces based on the split signal, split each of the plurality of layers into layer pieces, and set each of the layer pieces to be included in at least one of the page pieces; and a split page generator configured to generate split pages for the page pieces.

According to one or more example embodiments, a cartoon content displaying apparatus includes: a display unit configured to display a display region of carton content including split pages generated as a page including a plurality of layers split into at least two page pieces; and a controller configured to control the cartoon content to be displayed while adjusting display locations of the split pages such that the split pages overlap each other, and are displayed when location identifiers assigned to, the split pages are the same.

According to one or more example embodiments, a cartoon content generating method performed by a cartoon content generating apparatus including a split input controller, a split processor, and a split page generator, the cartoon content generating method comprising: controlling, by the split input controller, a split signal for splitting a page comprising a plurality of layers into at least two page pieces; splitting, by the split processor, the page into page pieces based on the split signal; splitting, by the split processor, each of the plurality of layers into layer pieces; setting, by the split processor, each of the layer pieces to be included in at least one of the page pieces; and generating, by the split page generator, split pages for the page pieces.

According to one or more example embodiments, a cartoon content displaying method includes: displaying a display region of cartoon content including split pages generated as a page including a plurality of layers split into at least two page pieces; and controlling the cartoon content to be displayed while adjusting display locations of the split pages such that the split pages overlap each other and are displayed when location identifiers assigned to the split pages are the same.

According to one or more example embodiments, a non-transitory computer readable storage medium stores computer-executable instructions and/or a computer program that when executed causes processing circuitry to perform cartoon content generating methods and/or cartoon content displaying methods discussed herein.

According to one or more example embodiments, a distribution server is configured to distribute computer-executable instructions and/or a computer program that when executed causes processing circuitry to perform cartoon content generating methods and/or cartoon content displaying methods discussed herein.

At least one other example embodiment provides an image content generating apparatus comprising: a memory having computer-readable instructions stored therein; and processing circuitry. The processing circuitry is configured to execute the computer-readable instructions to: split an image page into a plurality of page portions based on a split signal, the image page including a plurality of image layers, each of the plurality of image layers including at least one of an image and text; split at least a first of the plurality of image layers into a plurality of first image layer portions; associate each of the plurality of image layers and the plurality of first image layer portions with at least one of the plurality of page portions; and generate split image pages corresponding to the plurality of page portions, at least a first of the split image pages including at least one of (i) an image layer from among the plurality of image layers and (ii) a first image layer portion from among the plurality of first image layer portions, the at least one of the image layer and the first image layer portion being associated with a page portion, from among the plurality of page portions, corresponding to the first of the split image pages.

The processing circuitry may be further configured to execute the computer-readable instructions to control the split signal for splitting the image page into the plurality of page portions. The split image pages may be ordered based on the corresponding plurality of page portions such that the split image pages are loaded at different times.

The split signal may include information associated with a split line traversing a page region corresponding to the image page prior to being split. The plurality of page portions may correspond to sub-regions of the page region, the sub-regions being identified based on the split line.

The processing circuitry may be further configured to execute the computer-readable instructions to: determine whether the split line traverses a layer region of the page region, the layer region being a sub-region of the page region, the sub-region corresponding to a page portion associated with the first of the plurality of image layers; and split the first of the plurality of image layers into the plurality of first image layer portions, each of the plurality of first image layer portions corresponding to a sub-region generated based on the split line.

The processing circuitry may be further configured to execute the computer-readable instructions to associate the first image layer portion with a corresponding at least one of the plurality of page portions when the first image layer portion is located in a page region corresponding to the at least one of the plurality of page portions.

The processing circuitry may be further configured to execute the computer-readable instructions to distribute application of an effect among page portions associated with the plurality of first image layer portions when the split line traverses the layer region, the effect having been applied to the layer region.

The processing circuitry may be further configured to execute the computer-readable instructions to generate the split image pages corresponding to the plurality of page portions such that at least a first of the plurality of split image pages includes a (i) first region including a first of the plurality of page portions and (ii) a blank region corresponding to a second of the plurality of page portions.

Each of the split image pages may have a same size as the image page.

The processing circuitry may be further configured to execute the computer-readable instructions to assign a location identifier to the split image pages such that the split image pages at least partially overlap each other and are displayed at a same display location on a user terminal, location identifier corresponding to the image page.

The page region includes a canvas region corresponding to a display region to be displayed. The split line may traverse the canvas region such that each of the plurality of page portions includes a portion of the canvas region.

The processing circuitry may be further configured to execute the computer-readable instructions to: determine a loading order of the plurality of page portions based on relative locations of the split line and the plurality of page portions; and determine a stacking order of the split image pages according to the determined loading order of the plurality of page portions.

When the image page includes a plurality of cuts, the processing circuitry may be further configured to execute the computer-readable instructions to: generate a plurality of candidate split lines traversing a margin between the plurality of cuts; and split the image page based on a selected at least one of the plurality of candidate split lines, the at least one of the plurality of candidate split lines being selected based on a selection signal.

At least one other example embodiment provides an image content generating method, comprising: splitting, by processor circuitry, an image page into plurality of page portions based on a split signal, the image page including a plurality of image layers, each of the plurality of image layers including at least one of an image and text; splitting, by the processor circuitry, at least a first of the plurality of image layers into a plurality of first image layer portions; associating, by the processor circuitry, each of the plurality of image layer s and the plurality of first image layer portions with at least one of the plurality of page portions; and generating, by the processor circuitry, split image pages corresponding to the plurality of page portions, at least a first of the split image pages including at least one of (i) an image layer from among the plurality of image layers and (ii) a first image layer portion from among the plurality of first image layer portions the at least one of the image layer and the first image layer portion being associated with a page portion, from among the plurality of page portions, corresponding to the first of the split image pages.

The method may further include: controlling, by the processor circuitry, the split signal for splitting the image page into the plurality of page portions.

The method may further include: ordering the split image pages on the corresponding plurality of page portions such that the split image pages are loaded at different times.

The split signal may include information associated with a split line traversing a page region corresponding to the image page prior to being split, and the plurality of page portions correspond to sub-regions of the page region, the sub-regions being identified based on the split line.

The splitting at least a first of the plurality of image layers may include: determining whether the split line traverses a layer region of the page region, the layer region being a sub-region of the page region, and the sub-region corresponding to a page portion associated with the first of the plurality of image layers; and splitting the first of the plurality of image layers into the plurality of first image layer portions, each of the plurality of first image layer portions corresponding to a sub-region generated based on the split line.

The method may further include distributing application of an effect among page portions associated with the plurality of first image layer portions when the split line traverses the layer region, the effect having been applied to the layer region.

At least one other example embodiment provides a non-transitory computer-readable recording medium having recorded thereon a program, which when executed by processing circuitry, causes the processing circuitry to perform an image content generating method comprising: splitting, by processor circuitry, an image page into plurality of page portions based on a split signal, the image page including a plurality of image layers, each of the plurality of image layers including at least one of an image and text; splitting, by the processor circuitry, at least a first of the plurality of image layers into a plurality of first image layer portions; associating, by the processor circuitry, each of the plurality of image layer s and the plurality of first image layer portions with at least one of the plurality of page portions; and generating, by the processor circuitry, split image pages corresponding to the plurality of page portions, at least a first of the split image pages including at least one of (i) an image layer from among the plurality of image layers and (ii) a first image layer portion from among the plurality of first image layer portions the at least one of the image layer and the first image layer portion being associated with a page portion, from among the plurality of page portions, corresponding to the first of the split image pages.

BRIEF DESCRIPTION OF THE DRAWINGS

Example embodiments will become apparent and more readily appreciated from the following description of the accompanying drawings in which.

DETAILED DESCRIPTION

Figure 1:
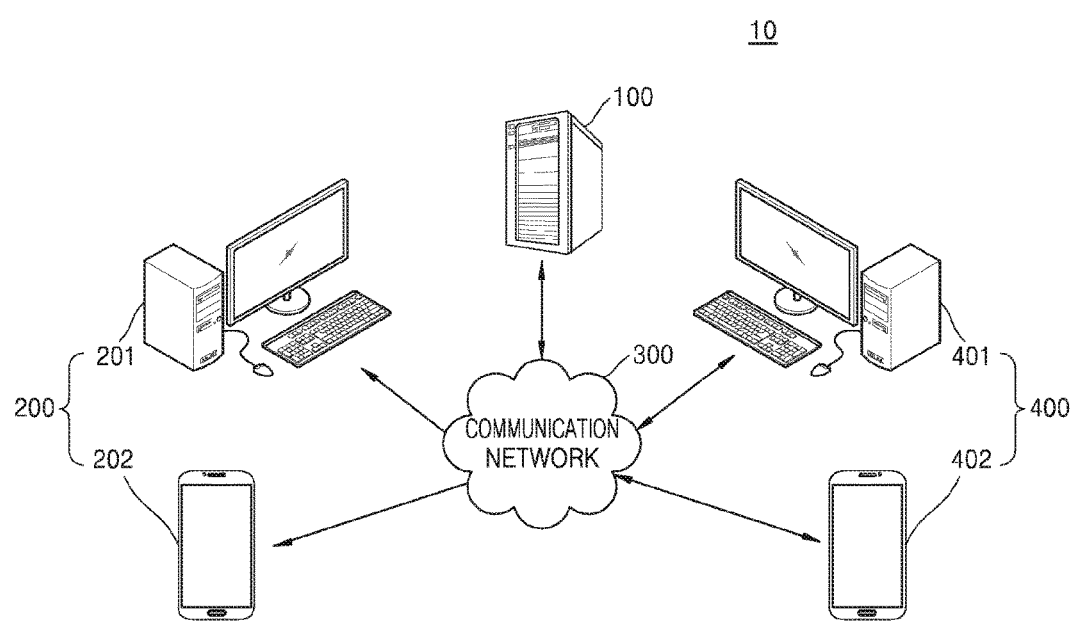
FIG. 1 is a diagram of a configuration of an image content providing system according to an example embodiment.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises," and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units, modules and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units, modules and/or devices according to one or more example embodiments may be implemented using hardware, software, and/or a combination thereof. For example, hardware devices may be implemented using processing and/or control circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units, modules and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

As discussed herein, image content may refer to cartoon content, which may be data generated by a cartoon content generator and/or a cartoonist. As discussed herein, an image content may also be referred to as cartoon content. Similarly, an image content displaying apparatus may be referred to as a cartoon content displaying apparatus, an image content generating apparatus may be referred to as a cartoon content generating apparatus, etc.

As discussed herein, a page may be an image file, and may correspond to a unit loaded into an image content displaying apparatus. One page may include one or more layers.

As discussed herein, a layer may have a transparent background used to independently edit various components existing in an image (e.g., a cartoon) scene. One layer may include at least one image and/or text as a foreground.

A page may include at least one cut. As discussed herein, a cut is a lower region in a page corresponding to an image scene (e.g., one cartoon scene). A cut may be formed through at least one layer.

A display region is a region of image content that is displayed to a user through a display device (also referred to herein as a display unit). Image content may correspond to and move according to user events. A display region may be changed according to movement of the image content, and displayed image content may be changed accordingly.

As discussed herein, an effect indicates an animation operation contained in a layer of at least a portion (e.g., whole or part) of the image content. In more detail, for example, an effect includes a movement of a layer, division, downward movement, upward movement, expansion, relatively slow movement, relatively fast movement, an operation causing a color change, a perspective effect of a cut, movement of a time difference, rotation, transparent processing, rescaling, setting a clipping region, etc. However, example embodiments should not be limited to only these examples, but rather different types of effects may be included.

According to at least one example embodiment, an animation operation may be displayed on (e.g., only on) a page including a layer to which an effect is applied. For example, a second page may be positioned (e.g., continuously positioned) at a lower end of a first page. If a specific layer, to which movement animation is applied and included in the first page, moves in a lower direction beyond a first page region, then the specific layer may not be displayed on a second page region.

A cut and/or a layer may include property information. Property information of the cut and/or the layer may include, for example, location information, depth information, and/or other effect information.

According to at least some example embodiments, location information is information relating to a layer and/or cut that is not fixed, but moves. The location information indicates a location at which a layer and a cut in which an effect (e.g., movement and/or a time difference effect) is set. The location information may designate an inner or outer location where the cut is displayed as a pixel value or a percent value. For example, in the case of a first cut including a first layer, initial and final locations of the first layer may be set as locations in the first cut.

Depth information is information regarding a display sequence of a plurality of layers included in a cut and/or layer. Depth information may be set as sequentially increasing or decreasing numbers from a layer that is to be displayed as an uppermost (e.g., first or initial) layer to a layer that is to be displayed as a lowermost (e.g., last) layer. A plurality of layers included in one cut and/or layer may be displayed according to depth information. In one example, in a case where an upper layer and a lower layer at least partially overlap, only the upper layer may be displayed.

Other effect information may include, for example, movement information, speed information, music information, vibration information, color information, an effect display start time, etc. For example, effect information may include: information regarding an initial location, a final location, a start time, or an end time of a layer and/or cut; information regarding a color change time and/or point; information regarding a first color that serves as initial color information; and/or information regarding a second color that is color information changed from the first color. Effect information may include a movement speeds such as 2 times, 3 times, ½ times, and ⅓ times of speed corresponding to, for example, a user event.

FIG. 1 is a diagram of a configuration of an image content providing system 10 according to an example embodiment. The image content providing system 10 may also be referred to as a cartoon content providing system.

Referring to FIG. 1, the image content providing system 10 includes: an image content server 100; an image content displaying apparatus 200; a communication network 300; and an image content generating apparatus 400. The image content server 100, the image content displaying apparatus 200, and the image content generating apparatus 400 may also be referred to as a cartoon content server 100, a cartoon content displaying apparatus 200, and a cartoon content generating apparatus 400, respectively.

The image content server 100 may provide image (e.g., cartoon) content or an image content display to a user terminal. The image content server 100 may provide image content classified according to, for example, authors, episodes, works, days of the week, etc. The image content server 100 may also provide works of which serial publishing has been finished. The image content server 100 may selectively provide image content according to one or more requests from the user terminal. The image content server 100 may transmit image (e.g., cartoon) content to a user terminal in an application form over the communication network 300. The image content server 100 may receive and store image content generated by the image content generating apparatus 400.

The image content generating apparatus 400 may provide the ability to generate image content by an image (e.g., cartoon) content generator (e.g., a cartoonist). In at least one example embodiment, the image content generating apparatus 400 may provide a user interface (UI) for more conveniently generating 2-dimensional (2D) image (e.g., cartoon) content. The image content generating apparatus 400 may generate one or more pages included in the image (e.g., cartoon) content, one or more cuts included in a page, one or more layers included in a cut, and/or apply an effect to one or more layers. The image content generating apparatus 400 may adjust (e.g., appropriately adjust) an effect application range and/or divide a page in order to subdivide a unit of image (e.g., cartoon) content; also referred to herein as an image content loading unit or a cartoon content loading unit. In this regard, the image content generating apparatus 400 may split one page into at least two pages to generate split pages.

A plurality of image content generating apparatuses 400 may refer to communication terminals using a web service in a wired and/or wireless communication environment. In one example, the image content generating apparatus 400 may be a personal computer (PC) 401 or a mobile terminal 402. The mobile terminal 402 is illustrated as a smart phone in FIG. 1, but example embodiments should not be limited thereto. According to at least some example embodiments, a terminal having an application capable of web browsing embedded therein may be employed in conjunction with example embodiments without limitation.

In more detail, for example, the image content generating apparatus 400 may be (or include) a computer (e.g., a desktop computer, a laptop computer, a tablet PC, etc.), a media computing platform (e.g., a cable, a satellite set-top box, a digital video recorder, etc.), a handheld computing device (e.g., a personal digital assistant (PDA), an email client, etc.), any type of a mobile phone, or other type of computing or communication platforms. However, example embodiments should not be limited to these examples.

The image content displaying apparatus 200 may be an apparatus that displays image (e.g., cartoon) content received from, or stored in, the image content server 100 in correspondence with a user event. According to at least some example embodiments, image content may include a general page and/or a split page generated by the image content generating apparatus 400. The image content displaying apparatus 200 may display image content while changing a display region of a display device at the user terminal and/or moving the image content according to a user event. At this time, the image content displaying apparatus 200 may sequentially locate and display pages based on a location identifier assigned to an image (e.g., cartoon) content page. Here, when a location identifier, which is the same as that assigned to a page before being split, is assigned to split pages, display locations of the split pages may be adjusted such that the split pages may overlap (e.g., at least partially) and be displayed.

Accordingly, the image content generating apparatus 400 may improve a loading speed of image pages and/or adjust an effect application range in the image pages.

The plurality of image content displaying apparatuses 200 may refer to communication terminals using a web service in a wired and/or wireless communication environment. In this regard, the image content displaying apparatuses 200 may include, for example, a PC 201 and/or a mobile terminal 202 of the user. The mobile terminal 202 is illustrated as a smart phone in FIG. 1, but example embodiments should not be limited to this example. As described above, a terminal having an application capable of web browsing embedded therein may be employed in conjunction with example embodiments without limitation.

In more detail, for example, the image content displaying apparatus(es) 200 may be (or include) a computer (e.g., a desktop computer, a laptop computer, a tablet PC, etc.), a media computing platform (e.g., a cable, a satellite set-top box, a digital video recorder, etc.), a handheld computing device (e.g., a PDA, an email client, etc.), any type of mobile phone, or other type of computing or communication platforms. However, example embodiments should not be limited to these examples.

Still referring to FIG. 1, the communication network 300 may connect the plurality of image content displaying apparatuses 200 and the image content server 100. That is, for example, the communication network 300 may provide communication and/or connection paths for transmitting and/or receiving data between the image content displaying apparatuses 200 and the image content server 100 when the image content displaying apparatuses 200 access the image content server 100. The communication network 300 may include, for example, wired networks such as local-area networks (LANs), wide-area networks (WANs), metropolitan area networks (MANs), integrated service digital networks (ISDNs), etc., or wireless networks such as wireless LANs, Code Division Multiple Access (CDMA) networks, Bluetooth networks, satellite networks, etc., but example embodiments are not limited thereto.

According to at least one example embodiment, the image content generating apparatus 400 may split a page including a plurality of layers into at least two page pieces together with the layer, and generate split pages having different orders by using the page pieces. Accordingly, the image content displaying apparatus 200 according to at least one example embodiment may sequentially load the split pages while displaying the overlapped split pages at the same or substantially the same location.

Figure 2:
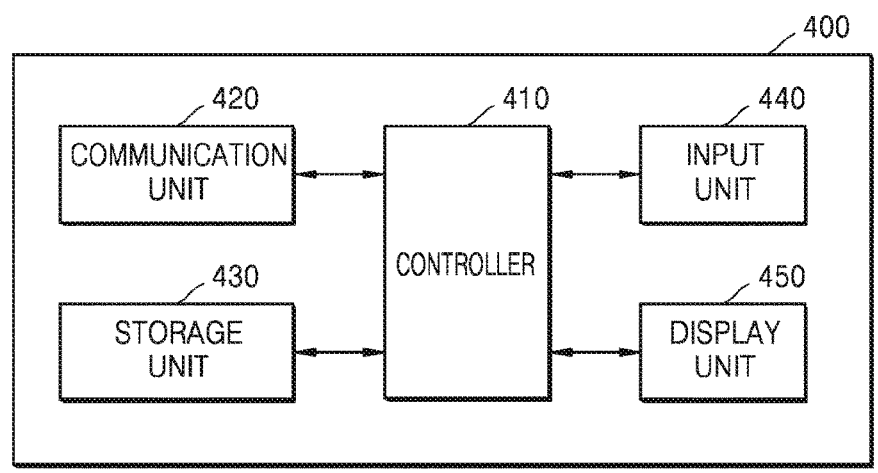
FIG. 2 is a block diagram illustrating an example internal configuration of an example embodiment of the image content generating apparatus shown in FIG. 1.

FIG. 2 is a block diagram illustrating an internal configuration of an example embodiment of the image content generating apparatus 400 shown in FIG. 1.

Referring to FIG. 2, the image content generating apparatus 400 includes: control circuitry 410; a communication device 420; a storage device 430; an input device 440; and a display device 450. The control circuitry 410 may also be referred to as a controller 410. The communication device 420, the storage device 430, the input device 440, and the display device 450 may be referred to herein as a communication unit, a storage unit, an input unit, and a display unit, respectively.

The controller 410 may generate a split page by considering at least one image file (hereinafter, referred to as a page) input through the input device 440, a split signal input through the input device 440, and information about a split line included in the split signal.

The communication device 420 may include one or more components that enable communication between the image content generating apparatus 400 and the image content server 100. For example, the communication device 420 may include a short-distance wireless communication circuitry and/or a mobile communication circuitry. Examples of the short-range wireless communication circuitry may include, but are not limited to, Bluetooth communication circuitry, Bluetooth low energy (BLE) communication circuitry, near-field communication circuitry, WLAN (e.g., Wi-Fi) communication circuitry, Zigbee communication circuitry, infrared data association (IrDA) communication circuitry, Wi-Fi direct (WFD) communication circuitry, ultra-wideband (UWB) communication circuitry, Ant+ communication circuitry, etc. The mobile communication circuitry may include an antenna and may exchange a radio signal with at least one among a base station, an external terminal, and a server in a mobile communication network. The radio signal may include a voice call signal, a video communication call signal, or other types of data via transmission and reception of text/multimedia messages. The communication device 420 may communicate with the image content server 100 to obtain image content or an application for displaying image content from the image content server 100.

The storage device 430 may store image content obtained through the communication device 420 in a memory (not shown).

The memory temporarily and/or permanently stores data processed by the controller 410 and/or data obtained through the communication device 420. Here, the memory may include a magnetic storage medium and/or a flash storage medium, but example embodiments are not limited to these examples. Rather, the memory may be any suitable memory including any of the memories discussed herein.

The storage device 430 may further include a program storage device (not shown) storing control software for performing an operation of splitting a page into page pieces according to a user device, an operation of splitting a layer included in a page into layer pieces, an operation of setting layer pieces to be included in page pieces, and an operation of generating split pages having an order by using page pieces. The program storage device may also be referred to herein as a program storage unit.

The input device 440 may be used by a user to input an event and/or data for controlling the image content generating apparatus 400. For example, the input device 440 may include a key pad, a dome switch, a touch pad (e.g., a contact capacitive type, a press resistive type, an infrared sensing type, a surface ultrasonic conductive type, an integration tension measurement type, a piezo effect type, or the like), a jog wheel, a jog switch, etc. However, example embodiments should not be limited to these examples.

The input device 440 may obtain a user input. For example, the input device 440 may obtain a drag input for adjusting a location of a displayed candidate split line or a selection input on a displayed candidate split line.

The display device 450 may display a UI for splitting a page. The display device 450 may display a page before being split, a layer included in a page, a split page, and a user input received through the input device 440 according to the UI. When the display device 450 is configured with a touch screen in which a touch pad forms a layer structure, the display device 450 may be used as an input device in addition to an output device. The display device 450 may include at least one of a liquid crystal display (LCD), a thin film transistor-liquid crystal display (TFT-LCD), an organic light-emitting diode (OLED) display, a flexible display, a three-dimensional (3D) display, an electrophoretic display, or the like. However, example embodiments should not be limited to these examples.

Figure 3:
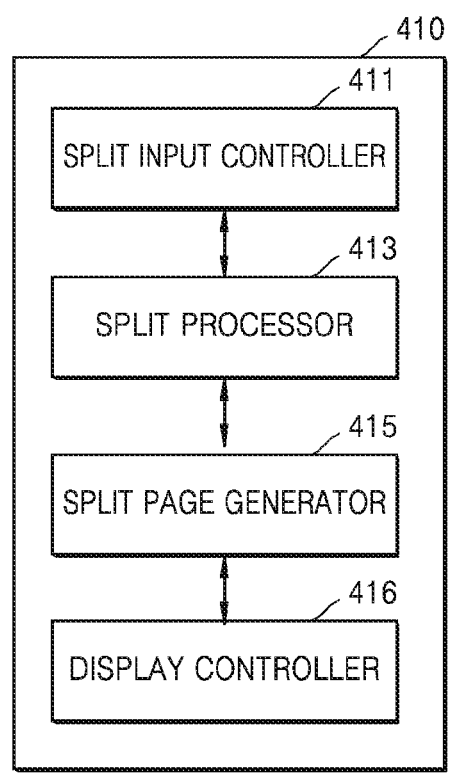
FIG. 3 is a block diagram illustrating an example embodiment of the controller shown in FIG. 2.

FIG. 3 is a block diagram illustrating an example embodiment of the controller shown in FIG. 2.

Referring to FIG. 3, the controller 410 includes: a split input controller 411; a split processor 4313; a split page generator 415; and a display controller 416. As discussed herein, the split input controller 411, the split processor 4313, the split page generator 415, and the display controller 416, may be referred to as split input control circuitry 411; split processing circuitry 4313; split page generator circuitry 415; and display controller circuitry 416, respectively.

The split input controller 411 controls a split signal for splitting a page including a plurality of layers into at least two page pieces to be received. The split signal may include information about a split line traversing a page region corresponding to the page. The page region is a region occupied by the page in a 2-dimensional (2D) plane. The page region includes both a canvas region to be displayed as a display region in an image data displaying apparatus, and a canvas outer region that is a non-display region and processes a layer and/or an effect. The split line may be set to traverse (e.g., always traverse) the canvas region such that a page piece or a split page, which includes only a non-display region, is not generated.

According to at least some other example embodiments, when a page includes a plurality of cuts, the split input controller 411 may generate candidate split lines traversing a margin between the cuts, and control a selection signal associated with at least one of the candidate split lines. For example, when a first cut exists at the top of a certain page, a second cut exists at the left bottom of the certain page, and a third cut exists at the right bottom of the certain page, the split input controller 411 may generate a first and second candidate split lines (e.g., in a margin) between the first through third cuts. The first candidate split line splits the top and bottom of the certain page, and the second candidate split line splits the left bottom and the right bottom of the certain page. When a candidate split line is selected and a closed region is generated, the page may be split using the selected candidate split line as the split line. In one example, when only the first candidate split line is selected, closed regions may be newly generated at the top and bottom of the certain page. In this regard, the certain page may be split into a top split page and a bottom split page. Also, when the first and second candidate split lines are selected, closed regions may also be generated at the left bottom and the right bottom of the certain page, and thus, the lower split page may be correspondingly split into a left bottom split page and a right bottom split page.

The image content generating apparatus 400 according to one or more example embodiments may generate split pages for not only pages, but also for split pages. That is, for example, the image content generating apparatus 400 may split the split pages into sub-split pages.

The split input controller 411 may generate a candidate split line traversing a page region, and control a location adjusting signal associated with the candidate split line. For example, the split input controller 411 may receive a signal for adjusting a location of a candidate split line traversing a page region corresponding to a page, and when a closed region is newly generated according to the adjusted location of the candidate split line, split the page by using the candidate split line as a split line.

The split processor 413 may split the page into page pieces based on the split line, split each of the plurality of layers into layer pieces, and/or set each of the layer pieces to be included in at least one of the page pieces.

In one example, the split processor 413 may split the page into the page pieces to respectively correspond to the closed regions (also referred to sometimes herein as sub-regions) formed using the page region and the split line. For example, when the split line traverses the page region in a horizontal direction, an upper page region and a lower page region may be formed based on the split line. The split processor 413 may split the page into an upper page piece corresponding to the upper page region, and a lower page piece corresponding to the lower page region.

The split processor 413 may determine whether the split line traverses a layer region for each of the plurality of layers, and when the split line traverses the layer region, the split processor 413 may split the layer into the layer pieces to respectively correspond to closed regions formed using the layer region and the split line. For example, when the split line does not traverse a layer from among the layers included in the page, such a layer may not be split. In this example, the layer region may be a region occupied by the layer in the page region.

When a certain layer piece is located in a page piece region corresponding to a certain page piece, the split processor 413 may set the certain layer piece to be included in the certain page piece. For example, when a split line traverses a page region and a layer region in a horizontal direction such that a page is split into an upper page piece and a lower page piece based on the split line and such that a layer is split into an upper layer piece and a lower layer piece, the upper layer piece may be located in a upper page piece region and the lower layer piece is located in a lower page piece region. As a result, the split processor 413 may set the upper layer piece to be included in the upper page piece, and set the lower layer piece to be included in the lower page piece.

According to at least one other example embodiment, when an effect is applied to a layer, which is traversed by a split line, the split processor 413 may apply the effect to each page piece in a divided manner. In at least this example, an effect may include a movement of a layer, division, downward movement, upward movement, expansion, relatively slow movement, relatively fast movement, an operation causing a color change, a perspective effect of a cut, a movement of a time difference, rotation, transparent processing, rescaling, setting a clipping region, etc. However, example embodiments should not be limited to this example. Rather, different types of effects may also be included.

In one example effect, a first layer to which a movement effect is applied may move such that a moving distance between an initial location and a final location corresponds to a user event. In another example effect, a second layer to which a perspective effect is applied may periodically move according to depth information of the second layer. In yet another example effect, a third layer to which a color changing effect is applied may change color from a first color to a second color based on a changing time input together with the color changing effect. A fourth layer to which a fast movement or slow movement effect is applied may move according to a moving speed input together with the relatively fast movement or relatively slow movement effect corresponding to a user event.

Hereinafter, an example of applying an effect to each page piece in a divided manner by using a first layer, to which a moving effect of moving from an initial location in a first page piece region to a final location in a second page piece region is applied, will be described.

First, each region through which the first layer passes through while moving is considered to be a region of the first layer. When a split line traverses the regions of the first layer, the split processor 413 may set a first page piece and a second page piece to commonly include the first layer and an effect applied to the first layer. The split processor 412 also sets the first page piece and the second page piece to synchronize an animation operation timer, such that the first and second page pieces are shown as if an animation operation is performed on the first layer in a page before split.

The split page generator 415 may generate split pages having different orders for each of the page pieces such that the page pieces are loaded at different times at a user terminal. In one example, the page and the split pages may have different time orders, and may be sequentially loaded in a direction from the front page to the back page.

According to at least some example embodiments, the split page generator 415 may generate a split page for a certain page piece such that the split page has blank regions corresponding to the remaining page pieces excluding the certain page piece. In this example, when a certain page is split into a first page piece and a second page piece, the split page generator 415 may generate a first split page in which a region corresponding to the second page piece is a blank region in the certain page, and a second split page in which a region corresponding to the first page piece is a blank region in the certain page. In this case, the certain page and the first and second split pages may have the same or substantially the same size.

The split page generator 415 may assign a location identifier corresponding to a page before being split into split pages such that the split pages overlap and are displayed at the same or substantially the same display location in a user terminal. For example, when a first split page and a second split page are generated by splitting a certain page, a location identifier of the certain page is assigned to the first split page such that the first split page is displayed at a location where the certain page was to be displayed if the certain page had not been split, and the location identifier of the certain page is also assigned to the second split page such that the second split page overlaps with the first split page at the same or substantially the same location when displayed. When the first split page is displayed at the location, only a part corresponding to the first page piece is displayed and a part corresponding to a blank region is not displayed. When the second split page is displayed overlapping with the first split page, a part corresponding to a second page piece is further displayed in the blank region, and thus, the first and second split pages are displayed without a blank region in a region having the same or substantially the same size as the page before split.

According to at least some example embodiments, the split page generator 415 may determine a loading order of page pieces based on relative locations of a split line and the page pieces. The split page generator 415 may also determine a stacking order of split pages according to the loading order of the page pieces. For example, when a top left pixel of a first page piece is located farther left and/or toward the top relative to a top left pixel of a second page piece with respect to the first and second page pieces obtained by splitting a page based on one split line, the split page generator 415 may determine a loading order having the order of the first page piece and then the second page piece. In this example, a first split page generated by using the first page piece is a front page of a second split page generated by using the second page piece.

The display controller 415, according to one or more example embodiments, may control the display device 450 to display a UI for splitting a page. The display controller 415 may control a page before being split, a layer included in the page, and/or a split page to be displayed according to a UI.

Figure 4:
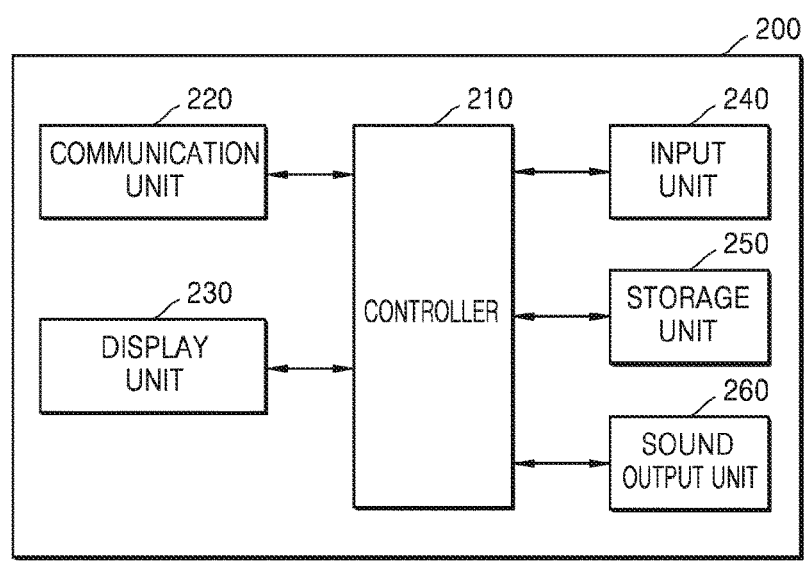
FIG. 4 is a block diagram illustrating another example internal configuration of an example embodiment of the image content displaying apparatus shown in FIG. 1.

FIG. 4 is a block diagram illustrating an internal configuration of an example embodiment of the image content displaying apparatus 200 shown in FIG. 1.

Referring to FIG. 4, the image content displaying apparatus 200 includes: a controller 210; a communication unit 220; a display unit 230; an input unit 240; a storage unit 250; and a sound output unit 260. As discussed herein, the controller 210, the communication unit 220, the display unit 230, the input unit 240, the storage unit 250, and the sound output unit 260a may be referred to as controller circuitry 210, a communication device 220, a display device 230, an input device 240, a storage device 250, and a sound output device 260, respectively.

The controller 210 may control image (e.g., cartoon) content to be displayed through the display device 230. The controller 210 may control split pages obtained by the image content generating apparatus 400 to be appropriately displayed. In one example, the controller 210 may control image content including split pages obtained when the image content generating apparatus 400, for example, splits a page according to setting of an image content generator (e.g., a cartoonist) to be displayed.

According to at least one example embodiment, the controller 210 may control a moving speed and/or a moving distance of image content such that at least one page included in the image content, at least one cut included in a page, at least one layer included in a cut, and/or an effect applied in layer and/or cut units, are suitably displayed.

In more detail, for example, when the image content generating apparatus 400 splits a page into split pages and location identifiers assigned to the split pages are the same, the controller 210 may control image content to be displayed while adjusting display locations of the split pages such that the split pages overlap each other.

The communication device 220 may include one or more components that enable communication between the image content displaying apparatus 200 and the image content server 100. For example, the communication device 220 may include short-distance wireless communication circuitry or mobile communication circuitry. Examples of the short-range wireless communication circuitry may include, but are not limited to, Bluetooth communication circuitry, Bluetooth low energy (BLE) communication circuitry, near-field communication (NFC) circuitry, WLAN (Wi-Fi) communication circuitry, Zigbee communication circuitry, infrared data association (IrDA) communication circuitry, Wi-Fi direct (WFD) communication circuitry, ultra-wideband (UWB) communication circuitry, Ant+ communication circuitry, etc. The mobile communication device may include an antenna and exchange a radio signal with at least one of a base station, an external terminal, and a server in a mobile communication network. The radio signal may include a voice call signal, a video communication call signal, or various types of data via transmission and reception of text/multimedia messages. The communication device 220 may communicate with the image content server 100 to obtain the image content and/or an application for displaying the image content from the image content server 100.

The display device 230 may display image content including the split pages generated by the image content generating apparatus 400. The display device 230 may display the image content by moving the image content according to a the user event with respect to the image content. The display device 230 may display the image content by moving the image content according to the moving speed and/or distance in consideration of the user event and the property information of the image content. Meanwhile, when the display device 230 is configured as a touch screen in which a touch pad forms a layer structure, the display device 230 may be used as an input device in addition to an output device. The display device 230 may include at least one of a liquid crystal display (LCD), a thin film transistor-liquid crystal display (TFT-LCD), an organic light-emitting diode (OLED) display, a flexible display, a 3D display, an electrophoretic display, etc. However, example embodiments should not be limited to these examples.

Still referring to FIG. 4, the input device 240 may be used by a user to input data for controlling the image content displaying apparatus 200. For example, the input device 240 may include a key pad, a dome switch, a touch pad (e.g., a contact capacitive type, a press resistive type, an infrared sensing type, a surface ultrasonic conductive type, an integration tension measurement type, a piezo effect type, etc.), a jog wheel, a jog switch, etc. However, example embodiments should not be limited to these examples.

The storage device 250 may store the image content obtained through the communication device 220.

The sound output device 260 may output audio data received from the communication device 220 and/or stored in a memory. The sound output device 260 may output sound signals relating to effect sound and/or background sound included in the cartoon content. The sound output device 260 may include a speaker and/or speaker circuitry, a buzzer and/or buzzer circuitry, etc.

The sound output device 260 may further include a vibration motor (not shown). The vibration motor may output a vibration signal. For example, the vibration motor may output a vibration signal corresponding to an output of audio data and/or image data (e.g., the effect sound and the background sound included in cartoon content). The vibration motor may also output the vibration signal when a touch is input to the touch screen.

Figure 5:
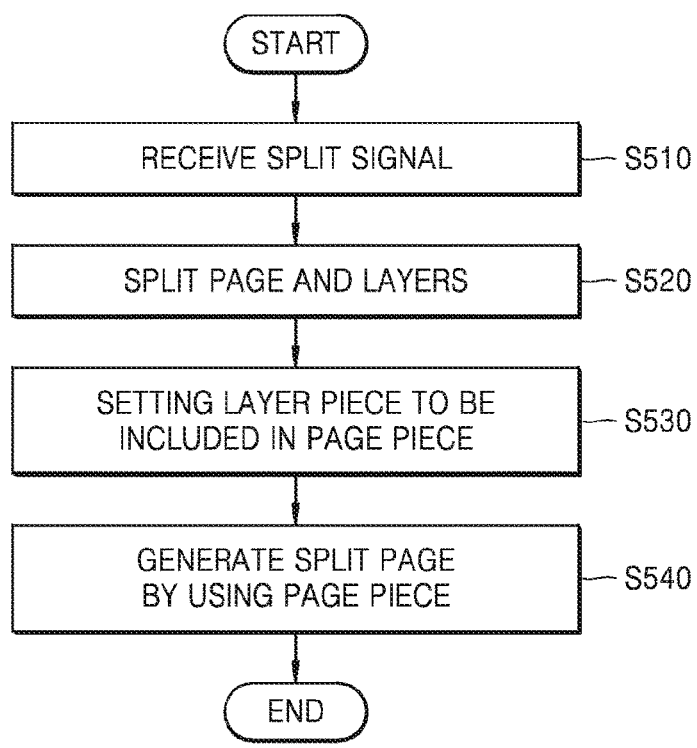
FIG. 5 is a flowchart illustrating an example embodiment of an image content generating method.

FIG. 5 is a flowchart illustrating an image content generating method according to an example embodiment.

Referring to FIG. 5, the image content generating method according to an example embodiment includes: controlling, by the split input controller 411, a split signal to be received (S510); splitting, by the split processor 413, a page and a plurality of layers (S520); setting, by the split processor 413, each layer piece to be included in at least one of page pieces (S530); and generating, by the split page generator 415, a split page for each page piece (S540).

In more detail with regard to FIG. 5, at S510 the split input controller 411 controls a split signal for splitting a page including a plurality of layers into at least two page pieces. In this example, the split signal may include information about a split line traversing a page region corresponding to the page.

At S520, the split processor 413 splits the page into page pieces based on the split signal, and splits each of the plurality of layers into layer pieces.

At S530, the split processor 413 sets each of the layer pieces to be included in at least one of the page pieces. In this example, the split processor 413 may split the page into page pieces corresponding to closed regions generated based on the page region and the split line.

At S540, the split page generator 415 may generate split pages having different orders for the page pieces such that the page pieces are loaded at different times at a user terminal. For example, the page and the split pages may have different temporal orders, and may be sequentially loaded in a direction from the front page to the back page.

Hereinafter, in FIGS. 6A, 6B, 7A through 7E, 8A through 8C, 9A through 9D and 10A through 10D, a page is shown in a rectangle having a folded right lower corner such that the page is easily distinguished from a cut or a layer.

Figure 6A:
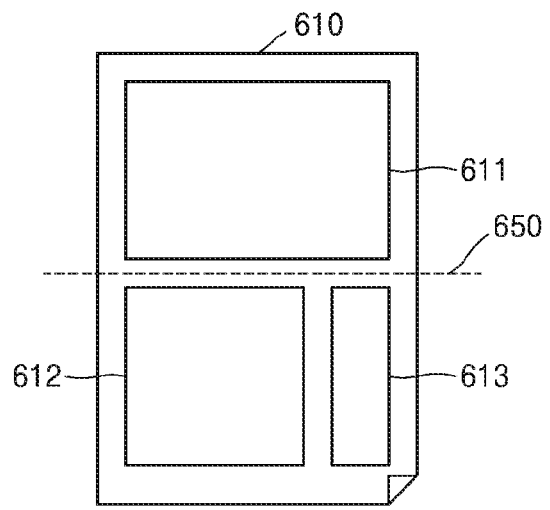
FIGS. 6A through 6C are diagrams illustrating an image content generating method, according to example embodiments.
Figure 6B:
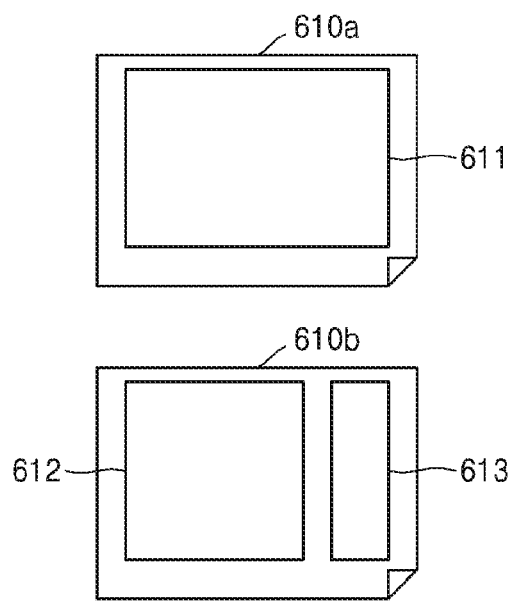
Figure 6C:
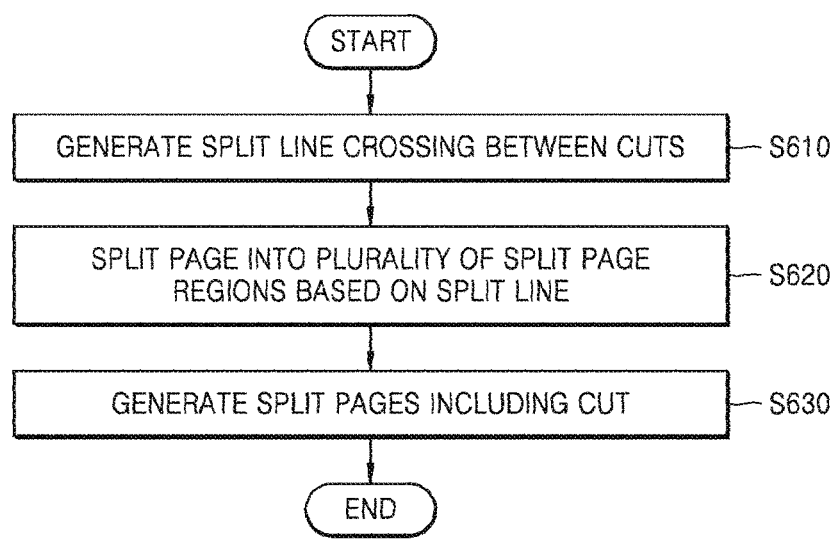

FIGS. 6A and 6B are diagrams illustrating an example embodiment of an image content generating method. FIG. 6C is a flow chart illustrating the example embodiment of the image content generating method discussed with regard to FIGS. 6A and 6B.

Referring to FIGS. 6A and 6B, first through third cuts 611 through 613 are included in a page 610, wherein the page 610 is split into a first split page 610a and a second split page 610b by a split line 650 on the page 610.

As shown in FIG. 6A, the split line 650 may be placed between the first cut 611 and the second and third cuts 612 and 613 on the page 610.

As shown in FIG. 6B, the image content generating apparatus 400 splits the page 610 into the first split page 610a including an upper region of the page 610, and the second split page 610b including a lower region of the page 610 based on the split line 650. The first cut 611 at the upper region of the page 610 is included in the first split page 610a, and the second and third cuts 612 and 613 at the lower region of the page 610 are included in the second split page 610b.

FIG. 6C is a flow chart illustrating operations discussed above with regard to FIGS. 6A and 6B.

Referring to FIG. 6C, in the image content generating method according to an example embodiment, in operation S610 a split input controller first generates the split line 650 crossing between the first cut 611 and the second and third cuts 612 and 613 according to a user input.

In operation S620, a split processor splits the page 610 into a plurality of split page regions based on the split line 650.

Although not shown in FIG. 6C, when the split line 650 crosses a certain cut, the certain cut may be split into split cuts based on the split line 650 in operation S620.

In operation S630, a split page generator generates the first and second split pages 610a and 610b such that a cut or a split cut corresponding to each of the split page regions is included in each of the split page regions.

As such, according to at least this example embodiment, a page may be split into at least two split pages by a split line on the page.

FIGS. 7A through 7F are diagrams illustrating another example embodiment of an image content generating method. In the example embodiment shown in FIGS. 7A through 7E, a page 710 utilizes the concept of a page region 730 and a canvas region 720. The page 710 is split through a split line 750 on the canvas region 720.

Figure 7A:
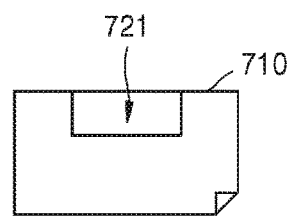
FIGS. 7A through 7F are diagrams illustrating an image content generating method, according to example embodiments.

Referring to FIG. 7A, a layer 721 is included in the page 710.

Figure 7B:
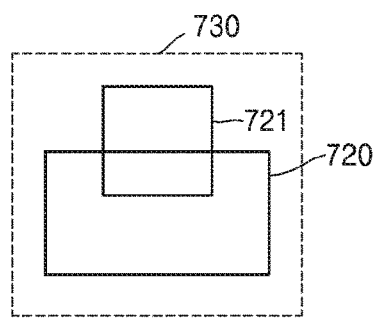

Referring to FIG. 7B, the page 710 includes the canvas region 720 at a lower region of the page region 730. The canvas region 720 is displayed as a display region through the image content displaying apparatus 200. In this example, since the layer 721 is located at a border of the canvas region 720, the image content displaying apparatus 200 may display only a part of the layer 721 corresponding to an inner region of the canvas region 720. In other words, as shown in FIG. 7A, the image content displaying apparatus 200 may display the page 710 such that only a part of the layer 721 is included in the page 710.

Figure 7C:
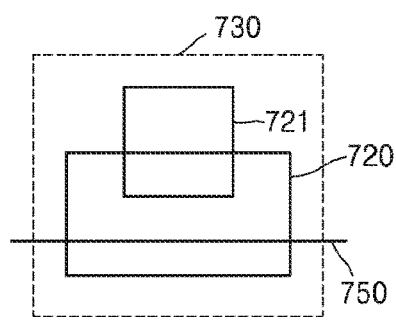

As shown in FIG. 7C, the split line 750 may concurrently and/or simultaneously traverse the page region 730 and the canvas region 720.

Figure 7D:
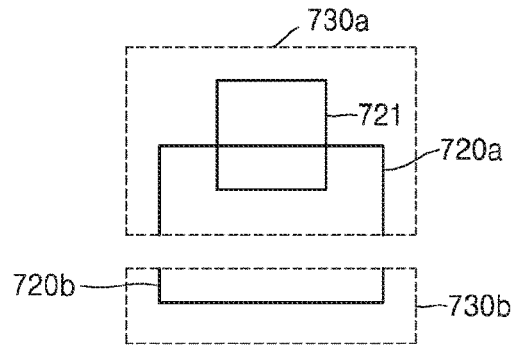
Figure 7E:
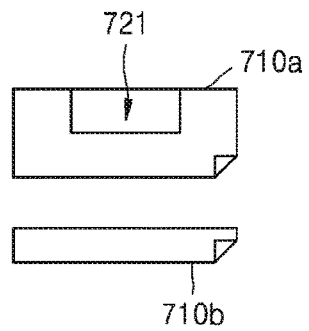

As shown in FIG. 7D, the image content generating apparatus 400 splits the page region 730 into a first split page region 730a, which corresponds to an upper region of the page region 730, and a second split page region 730b, which corresponds to a lower region of the page region 730, based on the split line 750. The layer 721 corresponding only to the upper region is not split and included in the first split page region 730a. In other words, as shown in FIG. 7E, the image content generating apparatus 400 splits the page 710 into a first split page 710a including the layer 721 and a second split page 710b that does not include the layer 721.

In at least some example embodiments, if the split line 750 traverses the page region 730, but does not traverse the canvas region 720, even when the page 710 is split, a display region of any one split page may not exist, and thus, the split line 750 may pass through the canvas region 720.

Figure 7F:
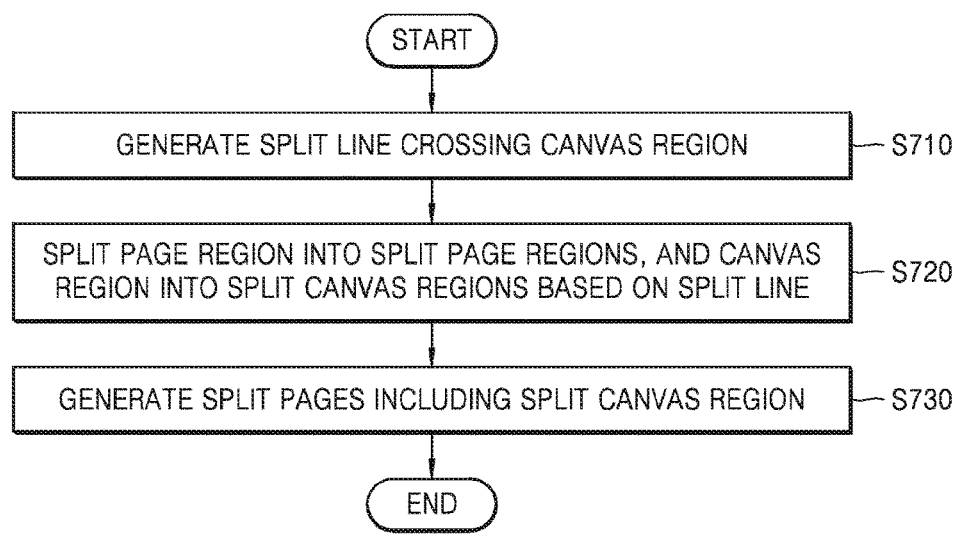

FIG. 7F is a flow chart illustrating operations discussed above with regard to FIGS. 7C through 7E.

Referring to FIG. 7F, in the image content generating method according to an example embodiment, in operation S710 a spilt input controller first generates the split line 750 crossing the canvas region 720 according to a user input.

In operation S720, a split processor may split the page region 730 into the first and second split page regions 730a and 730b based on the split line 750, and split the canvas region 720 into first and second split canvas regions 720a and 720b based on the split line 750.

In operation S730, a split page generator generates the first and second split pages 710a and 710b such that a split canvas region corresponding to each of the first and second split page regions 730a and 730b is included in each of the first and second split page regions 730a and 730b.

As such, in an image content generating method, according to an example embodiment, a page may be split into at least two split pages by a split line on a canvas region of the page.

FIGS. 8A through 8D are diagrams illustrating another example embodiment of an image content generating method.

Figure 8A:
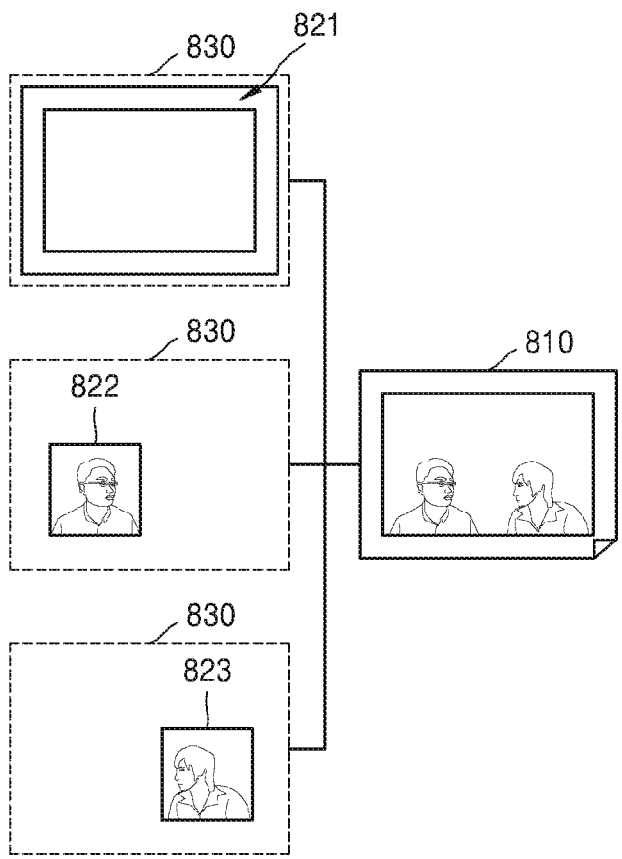
FIGS. 8A through 8D are diagrams illustrating an image content generating method, according example embodiments.
Figure 8B:
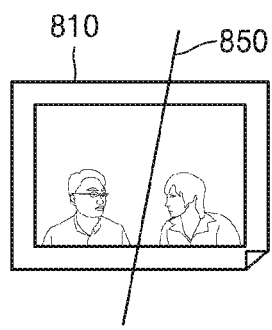
Figure 8C:
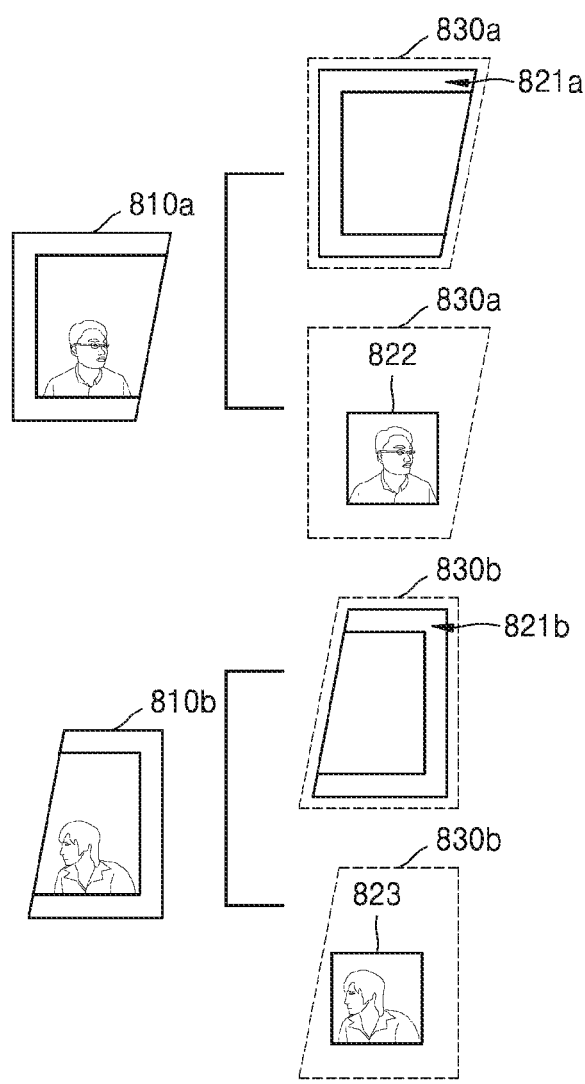

Referring to FIGS. 8A through 8C, a page 810 may include a plurality of layers 821 through 823. In this example, the image content generating apparatus 400 may split the page 810 into a first split page 810a and a second split page 810 based on a split line 850 on the page 810. The image content generating apparatus 400 may also split the layer 821 lying over the split line 850, and the layer 821 may be included in both the first and second split pages 810a and 810b.

As shown in FIG. 8A, a page region 830 may include the three layers 821 through 823.

As shown in FIG. 8B, the split line 850 may be located on the page 810 to traverse only the layer 821.

As shown in FIG. 8C, the image content generating apparatus 400 splits the page 810 into the first split page 810a at a left region and the second split page 810b at a right region based on the split line 850. The image content generating apparatus 400 may also split the layer 821 lying over the split line 850 into a first split layer 821a at the left region and a second split layer 821b at the right region. Since the first split layer 821a is located in a first split page region 830a, the first split layer 821a may be included in the first split page 810a Moreover, since the second split layer 821b is located in a second split page region 830b, the second split layer 821b may be included in the second split page 810b. Since the layers 822 and 823 do not lie over the split line 850, the layer 822 located in the first split page region 830a without split may be included in the first split page 810a, and the layer 823 located in the second split page region 830b may be included in the second split page 810b.

FIG. 8O is a flow chart illustrating operations discussed above with regard to FIGS. 8B and 8C.

Figure 8D:
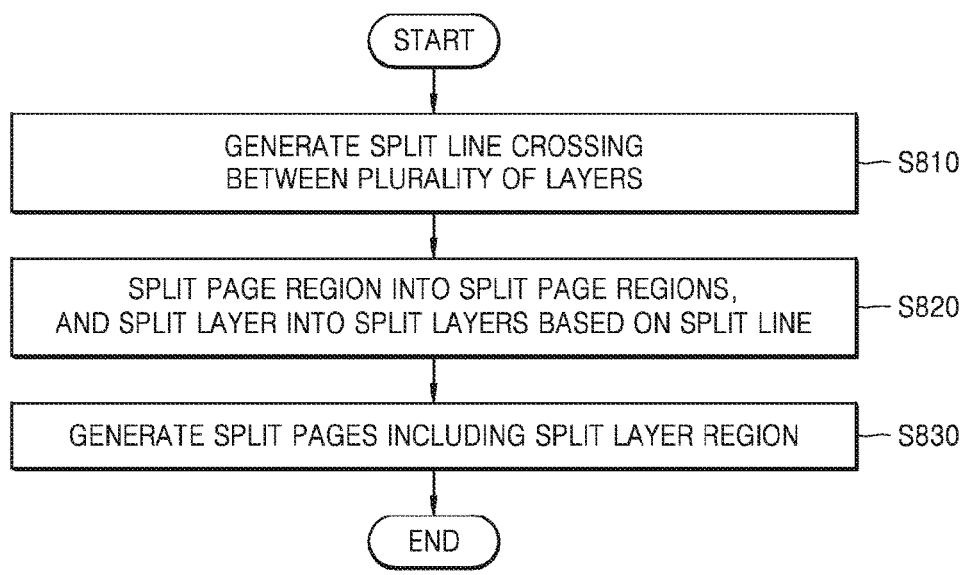

Referring to FIG. 8D, in the image content generating method according to an example embodiment, in operation S810 a split input controller first generates the split line 850 crossing between the plurality of layers 821 through 823 according to a user input.

In operation S820, a split processor splits the page region 830 into the first and second split page regions 830a and 830b based on the split line 850, and when the split line 850 crosses the layer 821, the split processor may split the layer 821 into the first and second split layers 821a and 821b based on the split line 850.

In operation S830, a split page generator generates the first and second split pages 810a and 810b such that a layer or split layer region corresponding to each of the first and second split page regions 830a and 830b is included in each of the first and second split page regions 830a and 830b.

According to at least this example embodiment, in an image content generating method, layers included in a page may also be split according to a split line and included in respective split pages.

FIGS. 9A through 9F are diagrams illustrating example embodiments of an image content generating method and an image content displaying method.

Referring to FIGS. 9A through 9E, the image content generating apparatus 400 may generate a first split page 910a and a second split page 910b. The first split page 910a includes a first page piece 930a and a blank region 960a corresponding to a second page piece 930b. The first split page 910a may have the same or substantially the same size as a page 910 before being split. The second split page 910b includes the second page piece 930b and a blank region as a region 960b corresponding to the first page piece 930a. The second split page 910b may have the same or substantially the same size as the page 910 before being split. The first and second split pages 910a and 910b may be displayed at different times by the image content displaying apparatus 200, and may be displayed at the same or substantially the same location in an overlapping (e.g., at least partially overlapping) manner.

Figure 9A:
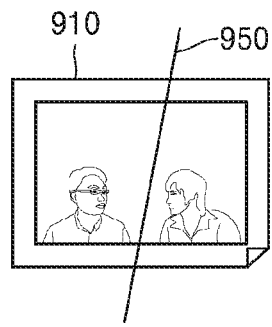
FIGS. 9A through 9F are diagrams illustrating an image content generating method and image content displaying method, according to example embodiments.
Figure 9B:
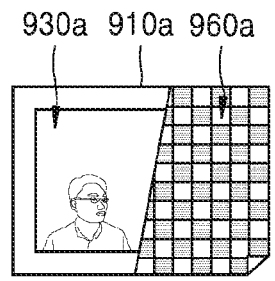
Figure 9B:
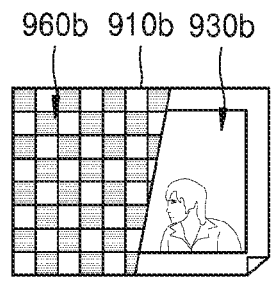

In more detail, as shown in FIG. 9A, a split line 950 may be placed on the page 910, and as shown in FIG. 9B, the image content generating apparatus 400 may split the page 910 into the first split page 910a including the first page piece 930a at a left region and the second split page 910b including the second page piece 930b at a right region based on the split line 950. The first split page 910a may include a blank region 960a, and may have the same or substantially the same size as the page 910 before being split. The second split page 910b may include the blank region 960b, and may have the same or substantially the same size as the page 910 before being split.

Figure 9C:
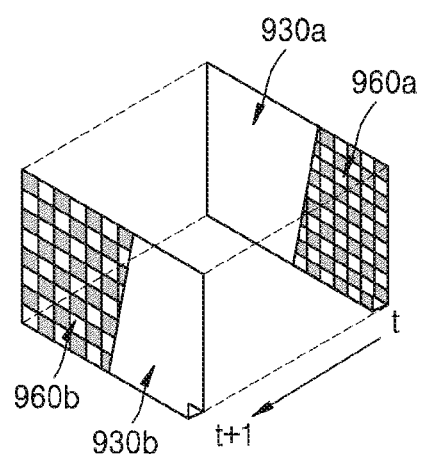

As shown in FIG. 9C, the first split page 910a may be displayed at a first time t, and the second split page 910b, which is a page behind the first split page 910a, may be displayed at a second time t+1. The second time t+1 is later than the first time t. In this example, the first and second split pages 910a and 910b are displayed at the same or substantially the same location in an overlapping (e.g., at least partially overlapping) manner.

Figure 9D:
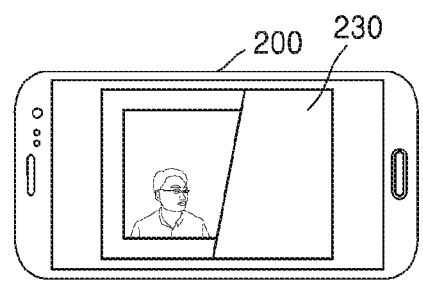
Figure 9E:
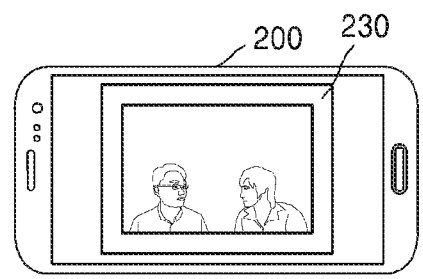

For example, as shown in FIG. 9D, the image content displaying apparatus 200 displays only the first split page 910a on the display device 230 at the first time t, and as shown in FIG. 9E, the image content displaying apparatus 200 displays the second split page 910b at the same or substantially the same location as the first split page 910a in an overlapping manner at the second time t+1.

Figure 9F:
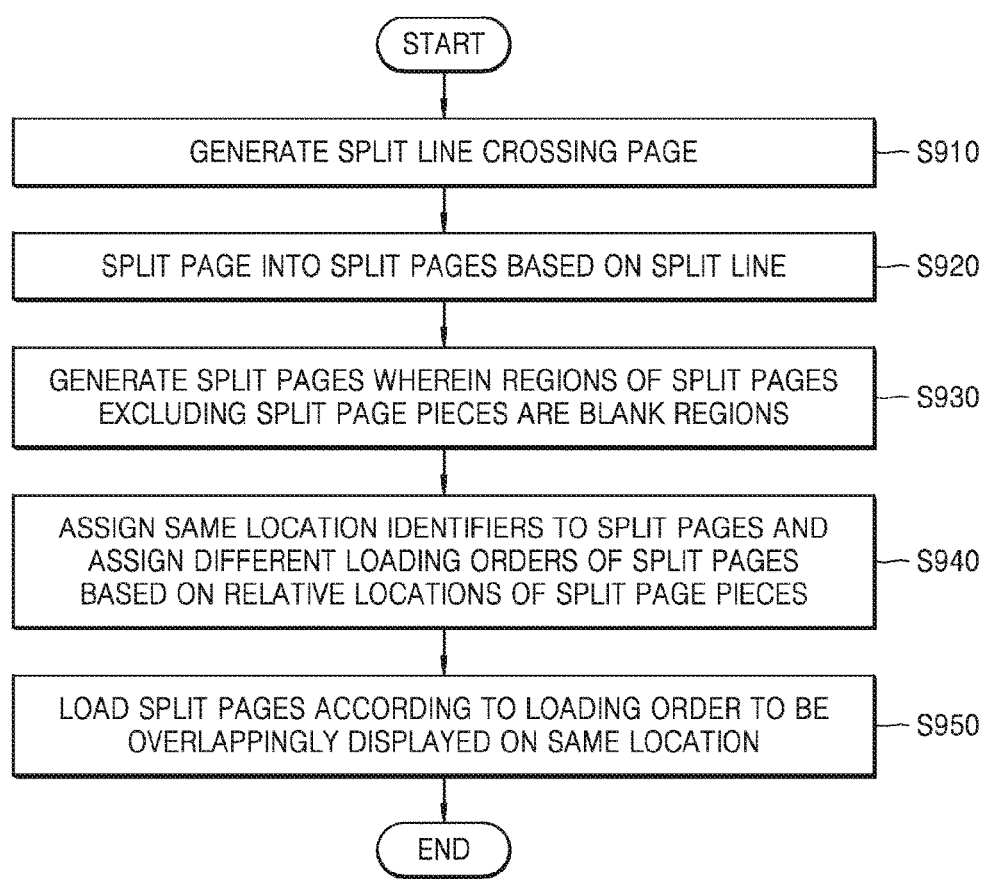

FIG. 9F is a flow chart illustrating operations discussed above with regard to FIGS. 9A through 9E.

Referring to FIG. 9F, in the image content generating method and the image content displaying method according to example embodiments, in operation S910 a split input controller first generates the split line 950 crossing the page 910 according to a user input.

In operation S920, a split processor splits the page 910 into the first and second split pages 930a and 930b based on the split line 950.

In operation S930, a split page generator generates pages having the same size as the page 910 before being split as the first and second split pages 910a and 910b, wherein regions of the first and second split pages 910a and 910b excluding the first and second split page pieces 930a and 930b are blank regions 960a and 960b.

In operation S940, a split page generator assigns the same location identifiers to the first and second split pages 910a and 910b while determining loading orders of the first and second split pages 910a and 910b to be different based on relative locations of the first and second split page pieces 930a and 930b.

In operation S950, a display unit sequentially loads the first and second split pages 910a and 910b according to the loading order to be overlappingly displayed on the same location.

As such, an image content displaying apparatus, according to at least some example embodiments, may generate split pages including a blank regions, and may display the generated split pages in an overlapping manner at the same or substantially the same location. The split pages may be naturally displayed at the same or substantially the same location as a page before being split.

FIGS. 10A through 10E are diagrams illustrating another example embodiment of an image content generating method.

Referring to FIGS. 10A through 10D, a page 1010 includes first through third cuts 1011 through 1013. A user 1000 may select first and second candidate split lines 1051 and 1052 between the first through third cuts 1011 through 1013 to split the page 1010 into first through third split pages 1010a through 1010c.

Figure 10A:
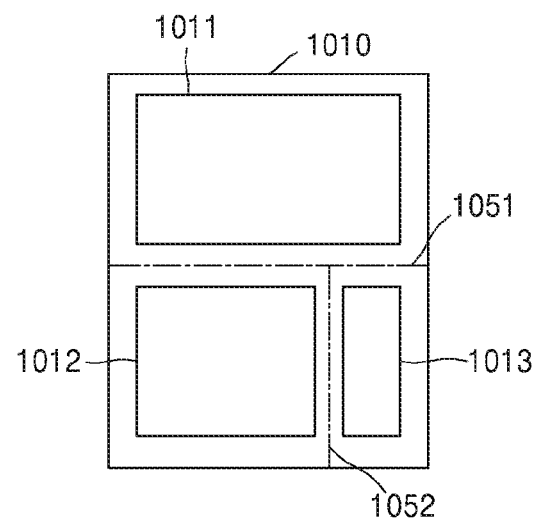
FIGS. 10A through 10E are diagrams illustrating an image content generating method, according to example embodiments.

In more detail, as shown in FIG. 10A, the image content generating apparatus 400 may place the first candidate split line 1051 in a margin between the first cut 1011 and the second and third cuts 1012 and 1013 of the page 1010. The second candidate split line 1052 may be placed in a margin between the second cut 1012 and the third cut 1013.

Figure 10B:
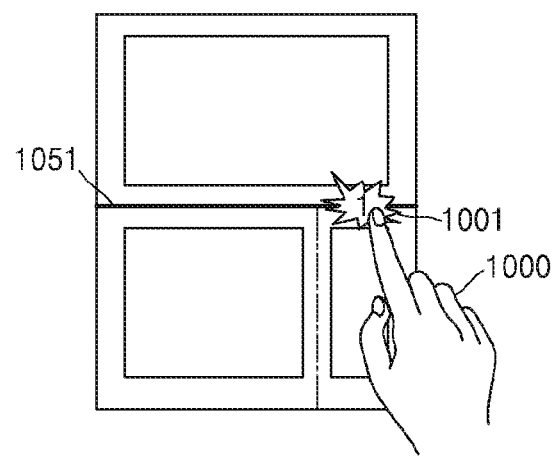
Figure 10C:
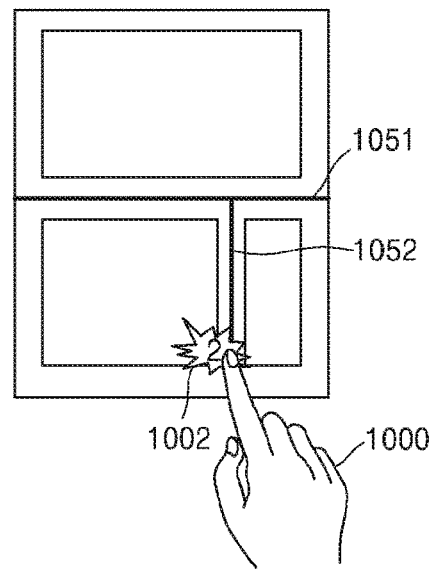

As shown in FIG. 10B, the user 1000 may select the first candidate split line 1051 (operation 1001). As shown in FIG. 10C, the user 1000 may select the second candidate split line 1052 (operation 1002). In this example, thicknesses or types of the first and second candidate split lines 1051 and 1052 may change to indicate whether the first and second candidate split lines 1051 and 1052 have been selected.

Figure 10D:
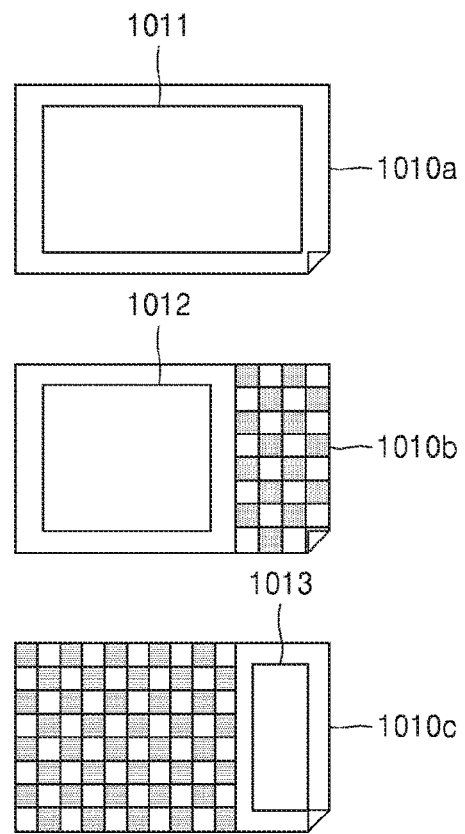

As shown in FIG. 10D, the image content generating apparatus 400 may split the page 1010 into split pages, each of which includes a respective one of the first through third cuts 1011 through 1013 based on the selected first and second candidate, split lines 1501 and 1052. In this example, the image content generating apparatus 400 may split the page 1010 into split pages, each of which corresponds to three closed regions formed based on the two split lines and a region of the page 1010. That is, for example, the image content generating apparatus 400 may generate the first split page 1010a corresponding to an upper region, the second split page 1010b corresponding to a left lower region, and the third split page 1010c corresponding to a right lower region.

Figure 10E:
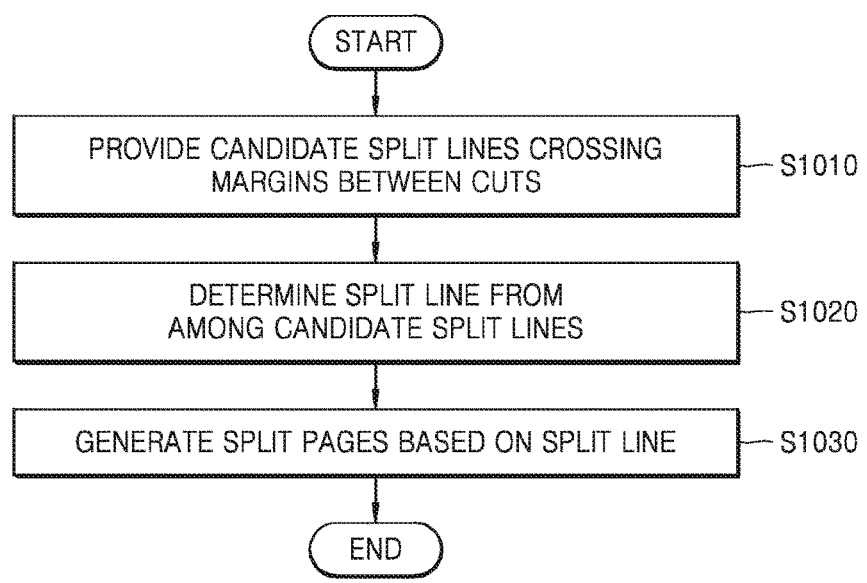

FIG. 10E is a flow chart illustrating operations discussed above with regard to FIGS. 10A through 10C.

Referring to FIG. 10E, in the image content generating method according to an example embodiment, in operation S1010 a split input controller first provides the first and second candidate split lines 1051 and 1052 crossing the margins between the first through third cuts 1011 through 1013 to the user.

In operation S1020, a split input controller determines at least one candidate split line selected by the user from among the first and second candidate split lines 1051 and 1052 as a split line.

In operation S1030, the page 1010 is split according to operations S620 and S630 of FIG. 6C or according to operations S920 through S950 of FIG. 9F to generate the first through third split pages 1010a through 1010c.

According to at least some example embodiments, the image content generating apparatus 400 may display candidate split lines between a plurality of cuts included in a page, and may split the page based on a candidate split line selected by a user.

Image content generating apparatuses, methods, and/or computer-readable storage mediums according to one or more example embodiments may split image pages according to an intention of an image content generator to improve loading speeds of an image page and/or adjust effects application range in the image page.

Image content generating apparatuses, methods, and/or computer-readable storage mediums according to example embodiments may split both layers and pages with respect to a page including a plurality of layers, and set a split layer to be included in the split page.

Image content displaying apparatuses according to example embodiments may control split pages to be more naturally connected and displayed.

Particular implementations shown and described herein are illustrative examples and are not intended to otherwise limit the scope of this disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent example functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope of inventive concepts as defined by the following claims.

What is claimed is:

1. An image content generating apparatus comprising:
   a memory having computer-readable instructions stored therein; and
   processing circuitry configured to execute the computer-readable instructions to
      split an image page into a plurality of page portions based on a split signal, the image page including a plurality of image layers, each of the plurality of image layers including at least one of an image and text;
      split at least a first of the plurality of image layers into a plurality of first image layer portions;
      associate each of the plurality of image layers and the plurality of first image layer portions with at least one of the plurality of page portions; and
      generate split image pages corresponding to the plurality of page portions, at least a first of the split image pages including at least one of (i) an image layer from among the plurality of image layers and (ii) a first image layer portion from among the plurality of first image layer portions, the at least one of the image layer and the first image layer portion being associated with a page portion, from among the plurality of page portions, corresponding to the first of the split image pages; wherein
      each of the split image pages has a same size as the image page.

2. The image content generating apparatus of claim 1, wherein the processing circuitry is further configured to execute the computer-readable instructions to control the split signal for splitting the image page into the plurality of page portions.

3. The image content generating apparatus of claim 1, wherein the split image pages are ordered based on corresponding page portions such that the split image pages are loaded into an image content displaying apparatus at different times.

4. The image content generating apparatus of claim 3, wherein
   the split signal includes information associated with a split line traversing a page region corresponding to the image page prior to being split; and
   the plurality of page portions correspond to sub-regions of the page region, the sub-regions being identified based on the split line.

5. The image content generating apparatus of claim 4, wherein the processing circuitry is further configured to execute the computer-readable instructions to
   determine whether the split line traverses a layer region of the page region, the layer region being a sub-region of the page region, the sub-region of the page region corresponding to a page portion associated with the first of the plurality of image layers; and
   split the first of the plurality of image layers into the plurality of first image layer portions, each of the plurality of first image layer portions corresponding to a sub-region generated based on the split line.

6. The image content generating apparatus of claim 5, wherein the processing circuitry is further configured to execute the computer-readable instructions to
   associate the first image layer portion with a corresponding at least one of the plurality of page portions when the first image layer portion is located in a page region corresponding to the at least one of the plurality of page portions.

7. The image content generating apparatus of claim 5, wherein the processing circuitry is further configured to execute the computer-readable instructions to
   distribute application of an effect among page portions associated with the plurality of first image layer portions when the split line traverses the layer region, the effect having been applied to the layer region.

8. The image content generating apparatus of claim 4, wherein the processing circuitry is further configured to execute the computer-readable instructions to
   generate the split image pages such that at least the first of the split image pages includes (i) a first region including a first of the plurality of page portions and (ii) a blank region corresponding to a second of the plurality of page portions.

9. The image content generating apparatus of claim 4, wherein
the page region corresponding to the image page prior to being split includes a canvas region corresponding to a display region to be displayed; and
the split line traverses the canvas region such that each of the plurality of page portions includes a portion of the canvas region.

10. The image content generating apparatus of claim 4, wherein the processing circuitry is further configured to execute the computer-readable instructions to
determine a loading order of the plurality of page portions based on relative locations of the split line and the plurality of page portions; and
determine a stacking order of the split image pages according to the loading order of the plurality of page portions.

11. The image content generating apparatus of claim 3, wherein, when the image page includes a plurality of cuts, the processing circuitry is further configured to execute the computer-readable instructions to
generate a plurality of candidate split lines traversing a margin between the plurality of cuts; and
split the image page based on a selected at least one of the plurality of candidate split lines, the at least one of the plurality of candidate split lines being selected based on a selection signal.

12. An image content generating apparatus comprising:
a memory having computer-readable instructions stored therein; and
processing circuitry configured to execute the computer-readable instructions to
split an image page into a plurality of page portions based on a split signal, the image page including a plurality of image layers, each of the plurality of image layers including at least one of an image and text,
split at least a first of the plurality of image layers into a plurality of first image layer portions,
associate each of the plurality of image layers and the plurality of first image layer portions with at least one of the plurality of page portions, and
generate a separate split image page corresponding to each respective page portion among the plurality of page portions, at least a first separate split image page including at least one of (i) an image layer from among the plurality of image layers and (ii) a first image layer portion from among the plurality of first image layer portions, the at least one of the image layer and the first image layer portion being associated with a page portion, from among the plurality of page portions, corresponding to the first separate split image page;
wherein the split signal includes information associated with a split line traversing a page region corresponding to the image page prior to being split, and the plurality of page portions correspond to sub-regions of the page region, the sub-regions being identified based on the split line;
wherein the separate split image pages are ordered based on the corresponding page portions such that the separate split image pages are loaded into an image content displaying apparatus at different times;
wherein the processing circuitry is further configured to execute the computer-readable instructions to generate the separate split image pages such that at least a first of the separate split image pages includes (i) a first region including a first of the plurality of page portions and (ii) a blank region corresponding to a second of the plurality of page portions; and
wherein the processing circuitry is further configured to execute the computer-readable instructions to assign a location identifier to the separate split image pages such that the separate split image pages at least partially overlap each other and are displayed at a same display location on a user terminal, the location identifier corresponding to the image page.

13. A image content generating method, comprising:
splitting, by processor circuitry, an image page into a plurality of page portions based on a split signal, the image page including a plurality of image layers, each of the plurality of image layers including at least one of an image and text;
splitting, by the processor circuitry, at least a first of the plurality of image layers into a plurality of first image layer portions;
associating, by the processor circuitry, each of the plurality of image layers and the plurality of first image layer portions with at least one of the plurality of page portions; and
generating, by the processor circuitry, a separate split image page corresponding to each respective page portion among the plurality of page portions, at least a first separate split image page including at least one of (i) an image layer from among the plurality of image layers and (ii) a first image layer portion from among the plurality of first image layer portions, the at least one of the image layer and the first image layer portion being associated with a page portion, from among the plurality of page portions, corresponding to the first separate split image page; wherein
each of the split image pages has a same size as the image page.

14. The image content generating method of claim 13, further comprising:
controlling, by the processor circuitry, the split signal for splitting the image page into the plurality of page portions.

15. The image content generating method of claim 13, further comprising:
ordering the separate split image pages based on the corresponding page portions such that the separate split image pages are loaded into an image content displaying apparatus at different times.

16. The image content generating method of claim 15, wherein
the split signal includes information associated with a split line traversing a page region corresponding to the image page prior to being split; and
the plurality of page portions correspond to sub-regions of the page region, the sub-regions being identified based on the split line.

17. The image content generating method of claim 16, wherein the splitting at least a first of the plurality of image layers comprises:
determining whether the split line traverses a layer region of the page region, the layer region being a sub-region of the page region, and the sub-region of the page region corresponding to a page portion associated with the first of the plurality of image layers; and
splitting the first of the plurality of image layers into the plurality of first image layer portions, each of the plurality of first image layer portions corresponding to a sub-region generated based on the split line.

18. The method of claim 17, further comprising:
distributing application of an effect among page portions associated with the plurality of first image layer portions when the split line traverses the layer region, the effect having been applied to the layer region.

19. A non-transitory computer-readable recording medium having recorded thereon a program, which when executed by processing circuitry, causes the processing circuitry to perform the image content generating method of claim 13.

* * * * *